Jan. 8, 1929.　　　　　　　　　　　　　　　　1,698,224
R. M. CRAIG
DISPLAY APPARATUS
Original Filed Dec. 29, 1925　　4 Sheets-Sheet 1

Jan. 8, 1929. 1,698,224
R. M. CRAIG
DISPLAY APPARATUS
Original Filed Dec. 29, 1925   4 Sheets-Sheet 3
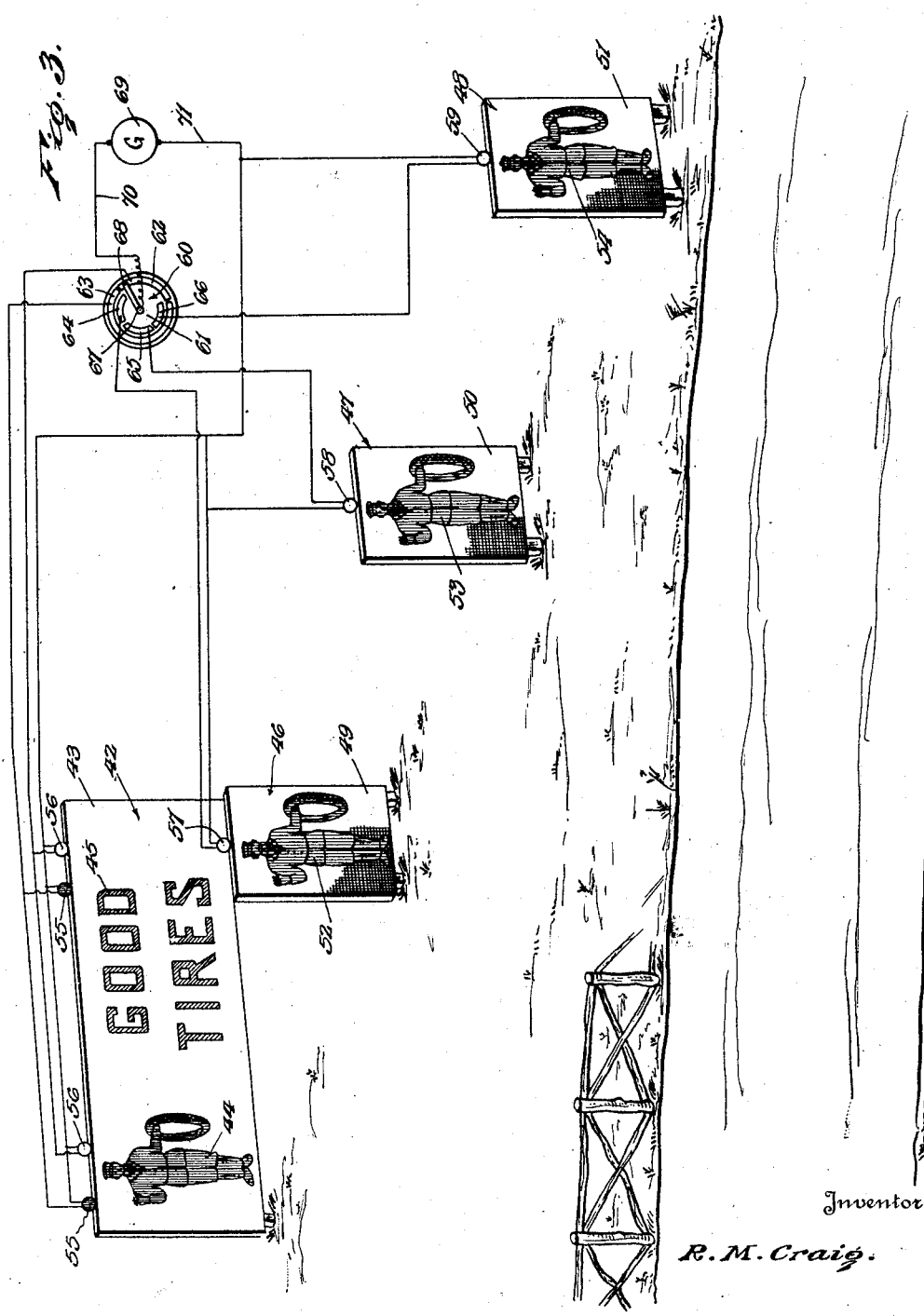

Jan. 8, 1929.
R. M. CRAIG
1,698,224
DISPLAY APPARATUS
Original Filed Dec. 29, 1925   4 Sheets-Sheet 4
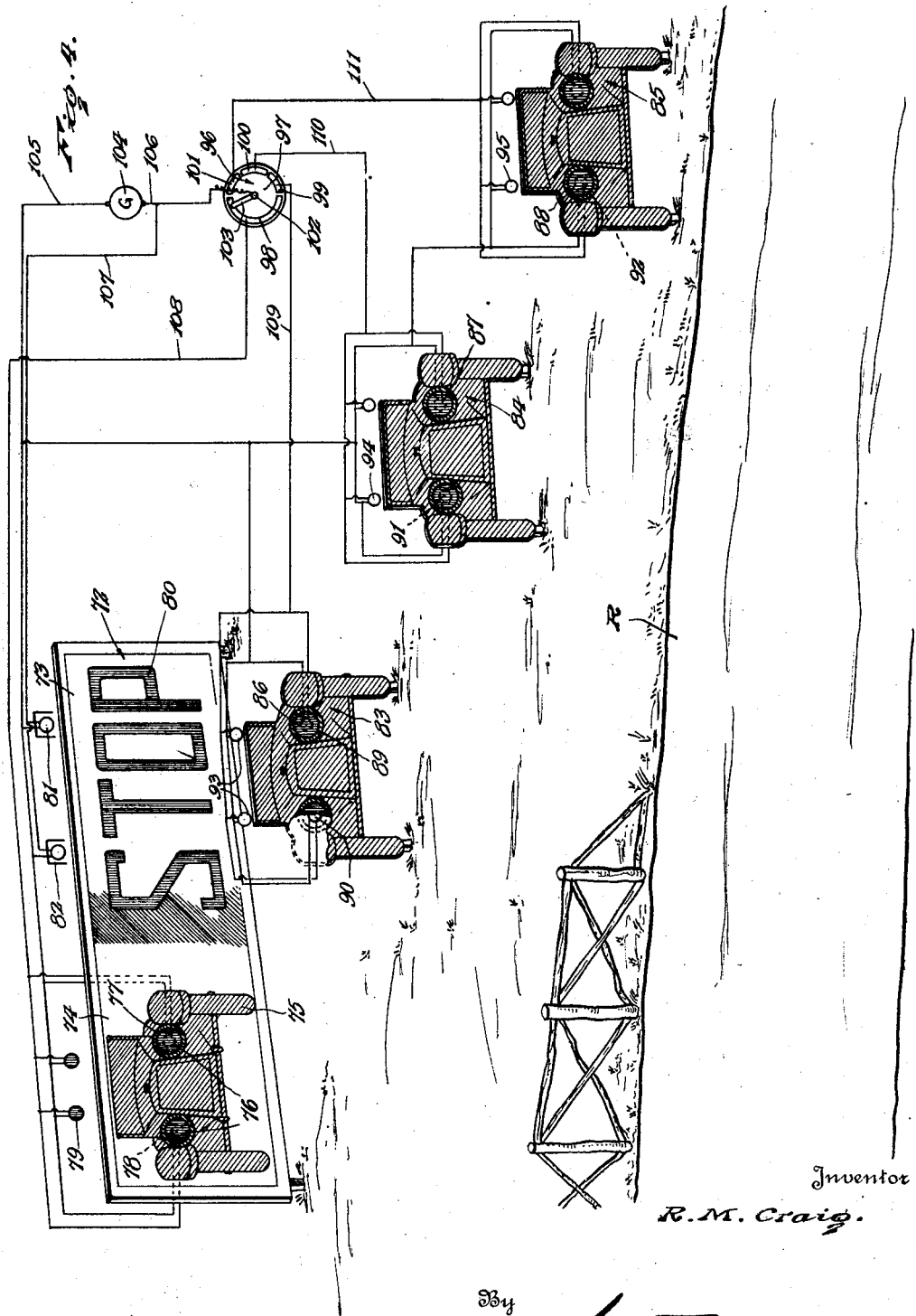
Inventor
R. M. Craig.
By
Lacy & Lacey, Attorneys Patented Jan. 8, 1929.

1,698,224

UNITED STATES PATENT OFFICE.

RICHARD M. CRAIG, OF SAN ANTONIO, TEXAS.

DISPLAY APPARATUS.

Application filed December 29, 1925, Serial No. 73,249. Renewed May 4, 1928.

This invention relates to a novel method of and apparatus for displaying the effect of motion, animation, or change in position of representations of animate and inanimate objects, through the application of the principles of color absorption and persistence of vision, for advertising, signaling, amusement, and various other purposes.

In various other co-pending applications, I have disclosed means for displaying or portraying the effect of motion, animation, or change in position or appearance of representations of animate and inanimate objects, upon a display surface by depicting the representations in pigment colors upon a display surface and then producing the desired display effect by illuminating the surface under light rays of contrasting colors so selected as to periodically absorb the pigment colors in a predetermined manner. In this manner, I have been enabled to produce the effects refered to, but the apparent change takes place in the plane of the display surface; and while this is very desirable under the conditions attending the use of the methods and apparatuses forming the subject matter of the said co-pending applications, the present invention has as its general object to provide a novel method of and apparatus for producing an entirely different effect, namely, the appearance of motion of the represented object in a direction other than transversely of the display surface. More specifically, the invention contemplates a method of and apparatus for displaying the effect of change in different distance positions of the represented object with respect to the observer.

The invention has for one of its objects to provide means whereby advertising matter may be displayed in such a manner as to very forcibly impress the matter upon the mind of the observer by a mystifying and startlingly sudden presentation of the subject matter of the advertising display in the substantially immediate presence of the observer after he has viewed the general subject matter of the advertising display from a distance. While signboards arranged along a highway have their value as advertising mediums, they hold little attraction for the observer when displayed in the ordinary manner, that is to say when the matter thereon is displayed under white light rays. In my said co-pending applications, decided departures from the commonplace signboard are disclosed, and the present invention contemplates a further carrying out of the principles embodied therein, in a manner to produce results which will immediately attract and hold the attention of the observer by reason of the startling changes which occur in the operation of the apparatus.

In another embodiment of the principles of the present invention, the object in view is to provide a safety signaling means for railroad crossings, road intersections, dangerous curves, detours, and other points in the extent of a highway where warning signals are required. The ordinary "caution" and "stop" signals, even when prominently displayed, do not at all times influence motorists to slacken their speed or observing other precautions to avoid accidents. Therefore, the present invention contemplates, in this respect, the provision of means whereby the necessity for taking precautions may be so forcibly impressed upon travelers upon a highway that none will be disinclined to heed the warning. In this connection, the invention also contemplates such adaptations of the principles of the invention to a warning signal that the signal may be utilized to great advantage, by dealers in automobiles and accessories, for advertising purposes.

In the accompanying drawings:

Figure 1 is a perspective view illustrating one application of the principles of the present invention to a novel advertising display, the view illustrating means whereby one display effect may be obtained.

Figure 2 is a view similar to Figure 1, illustrating means whereby a different effect may be obtained.

Figure 3 is a perspective view illustrating the application of the principles of the invention to an advertising display and disclosing means whereby the effect of intermittent or substantially continuous motion may be portrayed.

Figure 4 is a perspective view illustrating the application of the principles of the invention to a warning signal.

Figure 1 of the drawings exemplifies the application of the principles of the invention to a roadside advertising display and in this figure, the numeral 1 indicates in general a signboard or other display surface which is supported in an upright position at some distance from the side of the roadway indicated by the reference letter R, as for example twenty to forty feet, and which is nearly parallel to the line of extent of the roadway but not quite so, in order that it may be readily observed by one traveling along the roadway some moments before the observer reaches a point in the roadway opposite the said signboard. In the specific embodiment illustrated, the display surface of the board is painted white or some other light neutral color to provide a light neutral background indicated by the numeral 2, and by a light neutral color I mean one which is not materially changed under spectral light rays of a distinctive color and, therefore, does not possess the characteristics peculiar to primary pigment colors. Upon the background 2 and preferably near one end of the board, although some other location may be found suitable, there is represented, in red pigment, the image 3 of a man holding a tire in one hand as though to present the same, and having his other hand raised as though to halt the one toward whom the tire is presented. In this particular instance, the image representation is, as stated, in red pigment, although various combinations of colors at the red end of the spectrum may be employed, such for example as orange, magenta, pink, etc., and such colors may be employed singly or in combinations. Furthermore, the image representation may be of any other distinctive pigment color provided other conditions are suitable for the employment of such a color, as for example the character of the background and the character of the light sources through the medium of which the display surface is to be illuminated. Any suitable advertising matter relating to tires, such for example as the words "Good tires" and referring either to the quality of the tires or to the particular brand or make, is portrayed upon the display surface beside the image representation 3, as indicated by the numeral 4, and for this purpose, in the present embodiment of the invention, a dark neutral pigment such for example as brown, is employed. The numeral 5 indicates sources of red light rays as for example, red light bulbs which are arranged at the top of the display surface, and the numeral 6 indicates blue light bulbs which are similarly arranged and both sets of bulbs are so positioned that when the bulbs 5 are lighted, the display surface will be flooded with red light rays throughout its entire area and, when the blue light bulbs are lighted, the said surface will be flooded with blue light rays throughout its entire area. The method of illuminating the display surface will presently be pointed out, but at this point it is to be noted that when the display surface is illuminated by red light rays the image representation 3 will apparently be obliterated due to the fact that these spectral rays correspond in color to the color of the pigment or pigments in which the said image representation is portrayed and likewise due to the lack of contrast between the background and the image representations, under the conditions stated. Under this illumination the advertising matter 4 will be visible in a rich brown color. On the other hand, when the display surface is illuminated by blue light rays, the image representation 3 will appear substantially black against a substantially white background, and the advertising matter 4 will likewise appear very dark or substantially black against the light background. In one instance, therefore, both the image and the advertising matter representations are visible and in the other instance the advertising matter represented is visible and the image representation is totally obliterated.

The numeral 7 indicates a complementary display surface in the nature of a signboard which is positioned very close to the roadside and at substantially the same angle as the signboard 1. This board 7, or other display surface, has applied to it a pigment of a dark neutral color such for example as black, so as to provide a dark neutral background indicated by the numeral 8, and upon the surface there is represented, through the employment of a pigment red in color, the image 9 of a man assuming identically the posture assumed by the image represented at 3. A source of red light rays is provided in connection with a board 7 and preferably comprises one or more red electric light bulbs 10 arranged at the upper side of the said board in position to illuminate the same when the bulb is lighted. When the bulb is lighted, the image representation 9 will appear a brilliant white against a substantially black background, but, inasmuch as the display is intended for operation during night hours, the said image representation will ordinarily not be discernible at night and particularly is this true in view of the fact that it is represented upon a very dark neutral background.

In practice, the image representation 9 will be of dimensions actually less than the dimensions of the image representation 3 so that, due to perspective, or the distant location of the image representation 3, both image representations, if they were viewed simultaneously, would appear of the same size or dimensions.

The invention contemplates instantaneous and simultaneous obliteration of the image representation 3, after it has been displayed for a period of time, and display of the image representation 9, so that, to the observer, the effect is that of a man jumping from the point of location of the signboard 1 to a position immediately beside the roadway, and due to the relative arrangement of the signboards, the visual sensation is that of a man jumping directly at the observer who is traveling along the roadway, thus producing a very mystifying and startling impression upon the observer. This effect is, of course, produced through synchronous flashing of the sources of illumination, and a simple means by which this may be done is illustrated diagrammatically in Figure 1, and will now be described.

The numeral 11 indicates a source of current supply and the numeral 12 indicates in general an automatic flasher which may comprise a stationary disc of insulating material, indicated by the numeral 13, having arcuate contacts 14 and 15 mounted upon its face, the flasher further including a rotary shaft 16 and a contact arm 17 rotated through the medium of the said shaft in a manner to sweep successively over the contacts 14 and 15. A conductor wire 18 is led from one side of the source of current supply 11 to the shaft 16, or this side of the source of supply is electrically connected in any other suitable manner with the contact arm 17. A conductor wire 19 is led from the other side of the source of current supply and electrically connected with one terminal of each of the sockets for the electric light bulbs 5, 6 and 10. A conductor wire 20 is electrically connected with the contact 14 and with the other terminals of the sockets for the blue light bulbs 6. A conductor wire 20′ is electrically connected with the contact 15 and with the other terminals of the sockets for the red light bulbs 5 and 10. In the operation of the flasher 12, and as the contact arm 17 moves over the contact 14, the display surface of the signboard 1 will be flooded with blue light rays and the image representation 3 will stand out substantially black against a white background and the advertising matter 4 will likewise appear substantially black against a white background. At such time, the complementary board 7 will be substantially invisible as it is not illuminated. Therefore, in this cycle of operation of the apparatus, the entire surface of the main signboard 1 will be displayed to view. At the next moment, the contact arm 17 will sweep over the contact 15 and the red light bulbs 5 and 10 will be lighted. At such time, the image representation 3 will be instantly obliterated inasmuch as it is represented in a red pigment, but the advertising matter will still be displayed to view, appearing substantially black against a white background. Coincident with the obliteration or disappearance of the image representation 3, the image representation 9 upon the surface of the complementary board 7 will be displayed to view appearing substantially white and very brilliant against the black background 8, due to the illumination of the image representation by red light rays and the contrast between the image representation and the background which surrounds it. Inasmuch as the background is substantially black, the effect will be that of a man standing alone in the posture disclosed in Figure 1, and heretofore described, and as previously explained, the illusion is that of the image representation 3 upon the main display surface jumping from its distant point of location with relation to the roadway, directly to a position beside the roadway. This startling effect will naturally immediately attract the attention of motorists traveling over the highway and therefore a deep and lasting impression will be made upon the mind of the observer as to the subject matter of the display. In another portion of the description which is to follow, the application of the principles of the invention to apparatus for displaying a warning signal will be exemplified, but at this point it will be understood that subject matter such as to give warning of the presence of road conditions which warrant cautious driving, may be substituted for the advertising matter. That is to say, the general scheme of depicting the subject matter in pigment colors and displaying the same under complementary spectral light rays as disclosed in Figure 1, may be followed in displaying other sorts of matter, the principles involved being in no way limited to advertising displays.

Figure 2 of the drawings illustrates an application of the principles of the invention which in some respects is very similar to the application illustrated in Figure 1, and in said Figure 2, the numeral 21 indicates in general a main display surface which may be in the form of a signboard which is arranged some distance from the roadway R, and has any suitable light neutral pigment applied to its surface so as to provide a light neutral background indicated by the numeral 22 and corresponding to the background 2 of the main display surface of the previously described embodiment of the invention. The numeral 23 indicates an image representation which is depicted in red pigment and corresponds to the image representation 3, and the numeral 24 indicates advertising or other matter which is represented in a pigment of some dark neutral color such for example as brown, Indian red, tobacco brown, etc. Red light bulbs 25 are arranged at the upper side of the display surface, and white light bulbs 26 are similarly arranged, the arrangement of the bulbs being such that the display surface may be flooded with red light rays or with white light rays under conditions to be presently explained.

The auxiliary display surface is indicated in general by the numeral 27 and, as in the case of the corresponding display surface 7 of the previously described embodiment, is positioned close to the side of the roadway and is preferably in the form of a signboard. The surface of this board has applied to it a pigment of a light neutral color such as white or any of the other light neutral colors heretofore referred to, and is thus provided with a light neutral background 28, upon which there is depicted an image representation 29 which, in this instance, is in red or a combination of pigments at the red end of the spectrum. A white light bulb 30 is arranged at the upper side of the display surface 27 in position to flood the surface with white light rays under conditions to be presently explained. The numeral 31 indicates a source of current supply and the numeral 32 indicates an automatic flasher which may comprise a disc of insulating material 33 having contact strips 34 and 35 upon its face arranged concentric to a shaft 36 upon which there is fixed a contact arm 37 corresponding to the contact arm 17 of the first described embodiment and this arm is designed to sweep over the contact strips 34 and 35 in the rotation of the said shaft. A conductor wire 38 is led from one side of the source of current supply 31 and electrically connected with the shaft 36 or the contact arm 37. A similar conductor wire 39 is led from the other side of the source of current supply and is connected to one terminal of each socket for the red light bulbs 25, the white light bulbs 26 and the white light bulb 30. A conductor wire 40 is electrically connected with the contact strip 34 and is connected to the other terminals of the sockets for the white light bulbs 26, and a conductor wire 41 is led from the contact strip 35 and is connected with the other terminals for the red light bulbs 25 and the white light bulb 30.

In the operation of the flasher, and as the contact arm 37 sweeps over the contact strip 34, current will be supplied to the white light bulbs 26 and the display surface 21 will, therefore, be illuminated or flooded with white light rays, thus displaying the image representation 23 in the color in which it is depicted, namely red, and likewise displaying the matter 24 in its respective color, namely, brown, both representations appearing upon a white background. At such time the white bulb 30 will not be lighted and, inasmuch as the display is operated, through the medium of the flasher, only during night hours, the display surface 27 will be practically unnoticeable. As the contact arm 37 leaves the contact strip 34 and passes onto the contact strip 35, the white light bulbs 26 will be extinguished and the red light bulbs 25 and the white light bulb 30 will be instantly simultaneously lighted. Inasmuch as the image representation 23 is depicted in red and the display surface 21 is at this time flooded with red light rays, the said representation will be completely obliterated and, on the other hand, inasmuch as the image representation 29 is depicted in red and displayed under white light rays, it will be clearly visible to an observer. Consequently the effect is that of the image representation 23 jumping instantly from the main display surface 21 to the roadside. Under both conditions of illumination, the matter 24, being represented in a dark neutral color on a light background, will be visible. The image representations 23 and 29 will be relatively proportioned as regards their dimensions as in the previously described embodiment, and, therefore, while the two representations, in the drawings, appear of substantially the same dimensions, in practice, the representation 29 will be smaller than the representation 23 in accordance with perspective or, in other words, the distance between the image representations.

It will be understood, with reference to the embodiment shown in Figure 2, that the image representations 23 and 29 might be depicted in any distinctive color other than red, in which event, the light sources 25 would be of a corresponding spectral color. Also, it will be understood that as in the previously described embodiment of the invention, the principles above exemplified might be adapted to displays other than advertising displays and adapted, for example to a signal display.

In the adaptations of the invention disclosed in Figures 1 and 2, a single motion is portrayed, namely that of an image instantly changing its position from a point remote from to a point immediately at the roadway, but in Figure 3 of the drawings, the principles of the invention are illustrated as adapted to a display in which more than two changes in position take place. In this figure, the numeral 42 indicates in general a main display surface which may constitute a signboard such as the main display surface previously described, and to the surface of this board there is applied a pigment of any light neutral color to provide a light neutral background indicated by the numeral 43. Upon the display surface there is depicted, in a pigment of a distinctive color, such for example as red, an image representation 44 which may be of the same character as the image representations 3 and 23 of the previously described embodiments. Advertising or other matter 45 is likewise represented upon the display surface, but in this instance, this matter will be portrayed in a distinctive pigment color rather than in a neutral color as for example, green, and contrasting with the pigment color in which the image representation 44 is portrayed. The numerals 46, 47 and 48 indicate in general, complementary surfaces which are in the nature of smaller signboards arranged in planes parallel to that occupied by the board 42 and spaced with relation to each other and to the said board 42 an equal distance, the board 46 being located next to the board 42, the board 48 being located immediately beside the roadway, and the board 47 being located midway between the boards 46 and 48. A pigment of a dark neutral color such as any of the dark neutral colors heretofore referred to, is applied to the surface of each of the boards 46, 47 and 48, so as to provide the boards with dark neutral backgrounds indicated respectively by the numerals 49, 50 and 51. Image representations 52, 53 and 54 are depicted upon the boards 46, 47 and 48 respectively in a distinctive pigment color similar to that in which the image representation 44 is depicted, in this instance, red. The numeral 55 indicates red light bulbs arranged at the upper side of the main display board 42 and the numeral 56 indicates white light bulbs likewise arranged at the upper side of the display surface so that the surface may be flooded with red light rays through the medium of the bulbs 55 and with white light rays through the medium of the bulbs 56. White light bulbs 57, 58 and 59 are arranged respectively above the display surfaces 46, 47 and 48 so that these surfaces may be flooded with white light rays.

The numeral 60 indicates an automatic flasher of substantially the same type as previously described and comprising a disc 61 of insulating material upon the face of which are arranged contact strips 62, 63, 64, 65 and 66. The shaft of the flasher is indicated by the numeral 67 and the contact arm carried thereby is indicated by the numeral 68. The numeral 69 indicate a source of current supply, and a conductor wire 70 is led from one side of the source of supply and electrically connected with the shaft 67 or contact arm 68. A conductor wire 71 is led from the other side of the source of current supply and is connected with one terminal of the sockets for all of the bulbs above referred to.

In the operation of the flasher 60 and as the contact arm 68 moves over the contact strip 62, the circuit will be closed through the white light bulbs 56 and the display surface 42 will be flooded with white light rays, thus displaying the image representation 44 in red against a white background and simultaneously displaying the matter 45 in green against a white background. At this time, the display surfaces 46, 47 and 48 are substantially invisible and particularly in view of the fact that their backgrounds are black or of some other dark neutral color. As the contact arm 68 leaves the strip 62 and sweeps over the strip 63, the white lights 56 will be extinguished and the red lights 55 will be lighted. It will be observed that the contact strips 64, 65 and 66 are arranged concentric to the contact strip 63 and that the relatively adjacent ends of the strips 64 and 66 are substantially radially opposite the ends of the strip 63, so that as the contact arm 68 passes over the strip 63 throughout the entire length of the said strip, it will successively engage the contact strips 64, 65 and 66. Therefore, as the arm 68 rides into contact with the strip 63, it will likewise simultaneously contact the strip 64 and the white light 57 will be lighted, thus illuminating the display surface 46 with white light rays. When the red lights 55 are flashed on, as just explained, the display surface 42 will be flooded with red light rays and, therefore, the image representation 44, being in red, will be totally obliterated and becomes invisible, whereas the matter 45, being in green and, therefore, of a color contrasting with and complementary to the color of the spectral light rays, will appear substantially black against the white background 43 of the said display surface 42. At the instant the image 44 is obliterated, the image representation 52 will be, as stated, flooded with white light rays from the light bulbs 57 and this image representation will, therefore, appear a brilliant red against a black or other dark neutral background 49 and the observer will apparently see the image representation 44 jump from the display surface 42 to the position occupied by the display surface 46. At this point, it is to be noted that inasmuch as the background of the display surface 46 is black or of some other dark neutral color, it, in itself, will be substantially invisible under the white light rays, particularly in view of the brilliancy with which the image representation 52 will be displayed to view, under such illumination. In the continued movement of the contact arm 68, it will next sweep over the contact strip 65, thus extinguishing the lights 57 and closing the circuit through the bulbs 58 to flood the display surface 47 with white light rays and, in a further movement of the said arm, it will sweep over the contact strip 66, thus extinguishing the bulbs 58 and closing the circuit through the white light bulbs 59 to flood the display surface 48 with white light rays. In the meantime, the arm 68 is continually in contact with the strip 63 so that the red lights 55 remain burning and, therefore, the matter 45 is constantly displayed to the view of the observer. However, as the contact arm 68 rotates the visual effect produced will be that of the man holding the tire, constituting the image representation, jumping from the display surface 42 and by leaps, over the ground surface until he reaches the position occupied by the display surface 48, where he will appear directly at the roadside. By properly timing the flasher, in accordance with the law of persistence of vision, it will be evident that very startling effects can be obtained, due to the number of position changes which take place.

In the embodiment of the invention just described, pigment colors other than red may, of course, be employed, it being preferable, however, to select pigments which have a distinctive color and, of course, the color in which the matter 45 is represented, will be distinctive and will contrast with the color in which the image representations 44, 52, 53 and 54 are displayed. It will be understood, of course that the light ray sources 55 will be altered, as regards the color of their spectral rays, in accordance with any change made in the colors of the pigments employed in representing the display matter. It will also be evident, as in the preceding embodiments of the invention, that the principles exemplified in Figure 3 and in the description relating thereto may find embodiment in a signaling display or displays of various natures and for various purposes other than advertising or signaling.

In the foregoing description, reference has been made to the application of the principles of the invention to a signal display, and such application is exemplified in Figure 4 of the drawings. In this figure the numeral 72 indicates the main display surface, which, as in former embodiments, is preferably in the nature of a signboard, and to a portion of the area of this surface there is applied a dark neutral pigment to provide a dark neutral background area 73, a light neutral pigment being applied to the remaining portion of the area of the surface to provide a light neutral background area indicated by the numeral 74. Within the area 74 there is represented, in some distinctive pigment color such for example as green, an oncoming automobile, the representation being indicated by the numeral 75. For a purpose to be presently explained, the signboard 72 is formed with circular openings, and arranged within each of these openings is a pane or sheet of glass or any other suitable light ray transmitting material indicated by the numeral 76, which is in representation of one of the headlight lenses of an automobile, the pane or other light ray transmitting medium 76 being positioned in proper relation to the illustrated parts of the representation 75 to correspond with the location of the headlights upon an automobile. Preferably, a circular band of pigment is applied to the background area 74 encircling each light ray transmitting pane or other medium 76 and this band is in a dark neutral pigment, as indicated by the numeral 77. A white light bulb 78 is positioned behind each light ray transmitting pane 76, and red light bulbs 79 are arranged preferably at the top of the display surface and directly above the representation 75. A warning word such for example as "Stop" indicated by the numeral 80, is represented in a pigment of a distinctive color such for example as red, within the bounds of the background area 73 and at one side of the representation 75, the letters comprising the word being preferably of a relatively large size and of a bold and distinct type so as to render the word readily discernible. White light bulbs 81 are arranged at the top of the display surface and directly above the dark neutral background area 73 so that this portion of the display surface may be flooded with white light rays, and in order to prevent stray white light rays reaching the background area 74, the bulbs 81 are preferably shielded as indicated by the numeral 82. The numerals 83, 84 and 85 indicate respectively display surfaces which are arranged in spaced relation to each other, and with the surface 83 correspondingly spaced with relation to the display surface 72. These complementary display surfaces have the same outline as the image representation 75 so that each is of an outline simulating the front of an oncoming automobile, as viewed from the roadside which is indicated by the reference letter R. In other words, whereas in the previously described embodiments of the invention, the complementary display surfaces are in the form of substantially rectangular signboards, the display surfaces 83, 84 and 85 are each in the nature of a display board which bears the outline stated. The display boards 83, 84 and 85 are arranged parallel to the board 72 and are disposed at a slight angle to the line of extent of the roadway as are the boards of the previously described forms of the invention. Likewise, the main display surface 72 is located at some distance from the roadside whereas the display board 85 is located substantially directly at the roadside.

Circular panes or sheets of glass or other light ray transmitting material, red in color, indicated by the numerals 86, 87 and 88, are mounted in openings formed in the boards 83, 84 and 85 and each is preferably surrounded by a rim representation 89 preferably of a dark neutral color. Otherwise, the entire surface of the board is painted green or any other suitable distinctive pigment color, which color is in contrast with the red of the light ray transmitting pane 86. It will now be evident that in the illustrated embodiment of the invention there are four distinct representations of an oncoming automobile, each representation including, in its structure, a pair of headlight representations embodying red lenses or light ray transmitting representations thereof. White or red light bulbs, 90, 91 and 92 are arranged respectively behind the panes 86, 87 and 88, and one or more white light bulbs 93, 94 and 95 are arranged respectively above the display boards 83, 84 and 85, so that the surface of each board may, under conditions to be presently explained, be flooded with white light rays.

The numeral 96 indicates an automatic flasher which may be of the simple type hereinbefore described and comprising a disc 97 of insulating material and having contact strips 98, 99, 100 and 101 mounted upon its face concentric to the shaft of the flasher which is indicated by the numeral 102 and which carries a contact arm indicated by the numeral 103. The numeral 104 indicates a source of current supply, and a conductor wire 105 leads from one side of this source of supply and is connected by branch wires with one terminal of each socket for each of the light bulbs above referred to, this wire constituting a common return from all of the light bulb sockets. A conductor wire 106 leads from the other side of the source of current supply and is connected electrically with the shaft 102. A conductor wire 107 likewise leads from this last mentioned side of the source of current supply and is connected with the other terminals of the sockets for the white light bulbs 81, so that these bulbs, in the operation of the apparatus, burn continuously and, therefore continuously illuminate the background area 73 and continuously display to view the word of caution which is represented upon said background. A conductor wire 108 leads from the contact strip 98 and is connected with the other terminal of socket for each red light bulb 79 and likewise with the other terminal of the socket for each of the white light bulbs 78. A conductor wire 109 leads from the contact strip 99 and is connected to the other terminal of the sockets for the white light bulbs 93 and the other terminal of each socket for the white light bulbs 90. A conductor wire 110 is led from the contact strip 100 and is connected with the other terminal of the socket for each of the white light bulbs 94 and likewise to the other terminal of the socket for each of the white light bulbs 91, and a conductor wire 111 is led from the contact strip 101 and is connected to the other terminals of the sockets for the white light bulbs 85 and to the other terminal of each socket for the white light bulbs 92.

In the operation of the flasher and as the contact arm 103 sweeps over the contact strip 98, the circuit will be closed through the red light bulbs 79 and simultaneously through the white light bulbs 78. Therefore, the image representation 75 will be flooded with red light rays and will, therefore, appear substantially black against the light neutral background 74, and the rays from the white light bulbs 78 will be transmitted through the red light ray transmitting mediums 76. Consequently, a motorist approaching the display will apparently observe an automobile traveling toward him with glaring red headlights, the image representation 75 appearing substantially black against the white background area 74. He will likewise observe the representation 80 which, as previously stated, constitutes a warning word and which representation will appear a brilliant red against a black background under the white light illumination. At this time, the boards 83, 84 and 85 will be substantially invisible inasmuch as they are not illuminated nor are they so located as to receive any light rays from the sources of illumination employed in connection with the main board 72. However, at the moment the contact arm 103 leaves the contact strip 98 and rides onto the contact strip 99, the white lights 93 will be lighted as well as the lights 90, so that the automobile representation or display board 83 will be flooded with white light and present the appearance of a green automobile traveling head-on toward the observer, the rays from the white light bulbs 90 passing through the red light ray transmitting panes 86 so that apparently the automobile is equipped with glaring red headlights. Inasmuch as the representation 77 of the rim of a headlight casing upon the display surface 72 is of a dark neutral color, it will appear substantially black under the red light ray illumination and, therefore, the headlight representation will be sharply defined. This is likewise true in the instance of the rim representations 89 which are depicted in dark neutral pigment surrounding the light ray transmitting mediums 86, 87 and 88. Of course, when the contact arm 103 leaves the contact strip 98, the red lights 79 are instantly extinguished as well as the white lights 78 and, therefore, the image representation 75 becomes invisible or is, in other words, instantly obliterated. However, inasmuch as the bulbs 81 are directly in circuit with the source of current supply, they will burn continuously and the motorist will always observe the word "Stop" or any other warning which is displayed upon the background area 73. As soon as the contact arm leaves the contact strip 99 and passes onto the contact strip 100, the white lights 93 and 90 will be extinguished and the light bulbs 94 and 91 will be supplied with current so that the automobile representation 84 will be illuminated with white light rays and become clearly visible and the headlight representations comprising a part thereof will furnish a warning as in the instance of the headlight representations 86. As the contact arm 103 leaves the strip 100 and passes onto the strip 101, the white light bulbs 91 and 94 will be extinguished and the bulbs 92 and 95 will be automatically lighted so as to bring to view the automobile representation 85 and the headlight representations 88 embodied therein, the red glare from the light ray transmitting mediums 88 being directed onto the roadway.

It will be evident from the foregoing that immediately following the display of the representation 75, the representations 83, 84 and 85 are rapidly successively displayed to the view of the observer and, by properly timing the flasher 96, and through persistence of vision, the motorist, as he approaches the display, apparently observes an automobile traveling head-on toward him from the side of the roadway and he is, therefore, forcibly reminded of the necessity for driving with care until the curve or other point of danger has been passed. While this embodiment of the invention is primarily intended as a means for warning motorists of points of danger in a stretch of roadway, it may, at the same time, constitute an advertising medium, in which event, any suitable advertising matter may be painted or otherwise displayed upon the background area 73.

Having thus described the invention, what I claim is:

1. Means for displaying the effect of change in distance position of the same represented object comprising display mediums distantly disposed with respect to each other and each bearing a pigment representation of the object, and light ray sources for successively, simultaneously obliterating one of the representations and displaying the other.

2. Means for displaying the effect of change in distance position of a represented object comprising relatively spaced display mediums each bearing a pigment representation of the object, and means for successively, individually displaying the mediums under light rays possessing color characteristics such as to effect obliteration of one representation simultaneously with display of the other representation.

3. Means for displaying the effect of change in distance position of a represented object comprising a main display surface and a complementary display surface spaced with relation thereto, the main display surface bearing a representation of the object in a pigment color and also bearing other matter to be displayed, a complementary display surface bearing a representation of the object in a pigment color, and means for displaying the main display surface under light rays of a color to display all of the matter thereon and immediately subsequently simultaneously displaying both surfaces under light rays of a color to effect obliteration of the object representation and display of said other matter upon the display surface and simultaneous display of the object representation upon the complementary display surface.

4. Means for displaying the effect of change in distance position of a repesented object comprising a main display surface and a plurality of complementary display surfaces independently arranged and distantly spaced with relation to one another and with relation to the main display surface in the general direction in which they are presented for display, each surface bearing a representation of the object to be displayed, and means fo successively illuminating the surfaces in the order in which they are arranged beginning with the said main display surface.

5. Means for displaying the effect of change in distance position of a represented object comprising a main display surface and a plurality of complementary display surfaces, the said surfaces being independently arranged and distantly spaced with relation to one another and with relation to the main display surface in the general direction in which they are presented for display, each surface bearing a representation of the object to be displayed, and means for first illuminating the object representation upon the main display surface to display the same, and then obliterating the said object representation and immediately successively illuminating the complementary display surfaces each to the exclusion of the others and in the order in which they are arranged, beginning with the one next adjacent the main display surface.

6. Means for displaying the effect of change in distance position of a represented object and for also displaying a warning, comprising display surfaces spaced with relation to one another in the general direction in which they are presented for display, and each bearing a representation of the object to be displayed, a light ray transmitting medium associated with each display surface, and means for successively displaying each of said object representations by reflected light and its respective light ray transmitting medium by transmitted light, to the exclusion of the other object representation and its respective light ray transmitting medium.

7. Means for displaying the effect of change in distance position of a represented object and for also displaying a warning, comprising display surfaces spaced with relation to one another in the general direction in which they are presented for display and each bearing a representation of the object to be displayed, in a distinctive pigment color, a colored light ray transmitting medium associated with each display surface, and means for successively displaying each of said object representations under light rays of a spectral color to render the object representation visible, and simultaneously displaying its respective light ray transmitting medium by transmitted light, to the exclusion of the display of the other object representation and its respective light ray transmitting medium.

8. Means for displaying the effect of change in distance position of a represented object and for also displaying a warning, comprising a main display surface and a complementary display surface spaced with relation thereto in the general direction in which the surfaces are presented for display, the said main display surface bearing a representation, in a pigment color, of the object to be displayed and likewise bearing, also in a pigment color, a warning, the complementary display surface likewise bearing a pigment representation of the object to be displayed, and means for first displaying the main display surface under light rays of a spectral color to render the object representation visible and likewise under light rays of a color to render the warning visible, and then effect obliteration of the said object representation upon the main display surface and simultaneously effect display of the object representation upon the complementary surface simultaneously with continuous display of the warning upon the main display surface.

9. Means for displaying the effect of change in distance position of a represented object and for also displaying a warning, comprising a main display surface and a complementary display surface spaced with relation thereto in the general direction in which the surfaces are presented for display, the said main display surface bearing a representation, in pigment color, of the object to be displayed, and likewise bearing, also in a pigment color, a warning, the complementary display surface likewise bearing a pigment representation of the object to be displayed, means for first displaying the main display surface under light rays of a spectral color to render the object representation visible and likewise under light rays of a color to render the warning visible, and then effect obliteration of the said object representation upon the main display surface and simultaneously effect display of the object representation upon the complementary surface simultaneously with continuous display of the warning upon the main display surface, a light ray transmitting medium associated with each display surface as a part of the object representation thereon, and means for displaying said light ray transmitting medium by transmitted light simultaneously with the display of the respective object representation.

10. Means for displaying the effect of change in distance position of a represented motor propelled vehicle and for also displaying a warning, comprising display surfaces spaced with relation to one another in the general direction in which they are presented for display and each bearing a representation of the motor vehicle and, within the outlines of the representation, having a light ray transmitting area representative of the headlights of the vehicle, sources of light rays arranged in position to illuminate each of said surfaces, other sources of illumination arranged to illuminate the light ray transmitting headlight representations of each display surface, and means for successively energizing the light ray sources associated with each display surface whereby, due to the alternate display and obliteration of the surfaces, and the persistence of vision, the effect of apparent motion of the represented motor vehicle and its headlight representations will be produced.

In testimony whereof I affix my signature.

RICHARD M. CRAIG. [L. S.]